US009906253B2

(12) United States Patent
Welsh

(10) Patent No.: US 9,906,253 B2
(45) Date of Patent: Feb. 27, 2018

(54) SYSTEM AND METHOD FOR RECONFIGURING RF SIGNALS IN A MULTI-INPUT RECEIVER

(71) Applicant: Battelle Memorial Institute, Columbus, OH (US)

(72) Inventor: Raphael J. Welsh, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 15/121,608

(22) PCT Filed: Feb. 27, 2015

(86) PCT No.: PCT/US2015/017937
§ 371 (c)(1),
(2) Date: Aug. 25, 2016

(87) PCT Pub. No.: WO2015/131020
PCT Pub. Date: Sep. 3, 2015

(65) Prior Publication Data
US 2016/0365884 A1    Dec. 15, 2016

Related U.S. Application Data

(60) Provisional application No. 61/945,410, filed on Feb. 27, 2014.

(51) Int. Cl.
*H04B 1/10*    (2006.01)
*H04B 1/30*    (2006.01)
(Continued)

(52) U.S. Cl.
CPC .............. *H04B 1/30* (2013.01); *H04B 1/0064* (2013.01); *H04B 1/1036* (2013.01); *H04B 1/18* (2013.01); *H04B 1/74* (2013.01)

(58) Field of Classification Search
CPC ....... H04W 24/02; H04B 1/30; H04B 1/0064; H04B 1/1036; H04B 1/18; H04B 1/74
See application file for complete search history.

(56) References Cited

U.S. PATENT DOCUMENTS 5,752,200 A    5/1998    Meredith et al.
6,157,230 A   12/2000    O'Toole et al.
(Continued)

FOREIGN PATENT DOCUMENTS

WO    2006039312 A1    4/2006

OTHER PUBLICATIONS

Corbin, "High Frequency Direction Finding Using Structurally Integrated Antennas on a Large Airborne Platform", Thesis, Air Force Institute of Technology, Mar. 2011.
(Continued)

*Primary Examiner* — Shuwang Liu
*Assistant Examiner* — Sung Ahn
(74) *Attorney, Agent, or Firm* — Dinsmore & Shohl LLP

(57) ABSTRACT

A multi-input receiver including a plurality of RF antennas, a multi-channel receiver, an input port configuration block (IPCB), and a configuration block controller. The IPCB includes at least two two-way connection modules, at least one four-way connection module, at least one direct connection module, and a plurality of electronic signal pathways. Each connection module includes a connection module input port communicatively coupled to an RF antenna of the plurality of RF antennas, a connection module output port communicatively coupled to a channel of the multi-channel receiver, and a mechanical diversion switch. The mechanical diversion switches and the plurality of electronic signal pathways are positioned and configured such that the mechanical diversion switch of each connection module communicatively couples a splitter bypass signal, a 1×2
(Continued)

signal, or a 1×4 signal to the connection module output port on a selective basis.

20 Claims, 2 Drawing Sheets

(51) Int. Cl.
*H04B 1/00* (2006.01)
*H04B 1/18* (2006.01)
*H04B 1/74* (2006.01)

(56) References Cited

U.S. PATENT DOCUMENTS

| | | | |
|---|---|---|---|
| 6,268,828 B1* | 7/2001 | Martek | H01Q 3/242 |
| | | | 342/373 |
| 6,525,650 B1 | 2/2003 | Chan et al. | |
| 8,010,116 B2 | 8/2011 | Scheinert | |
| 8,401,134 B1 | 3/2013 | Steinbrecher | |
| 8,451,172 B2 | 5/2013 | Angeletti | |
| 2002/0054580 A1* | 5/2002 | Strich | H04W 16/06 |
| | | | 370/334 |
| 2012/0094624 A1* | 4/2012 | Soulhi | H04W 52/10 |
| | | | 455/226.2 |
| 2016/0049924 A1* | 2/2016 | Broyde | H01Q 21/0006 |
| | | | 343/745 |
| 2017/0070250 A1* | 3/2017 | Kundmann | H04B 1/1027 |

OTHER PUBLICATIONS

Fazel et al., "Space-Time Block Coded Reconfigurable MIMO Communication System using ORIOL Antennas", Wireless Communications and Networking Conference, 2008. WCNC 2008. IEEE, Mar. 31-Apr. 3, 2008.
Gulati et al., "Learning State Selection for Reconfigurable Antennas: A Multi-Armed Bandit Approach", IEEE Transactions on Antennas and Propagation, vol. 62, Issue: 3, Mar. 2014.
Jahoda, "Miniature Direction-Finding Antenna Array", High Frequency Electronics, pp. 52-57, Apr. 2007.
Sadler, "HF Radio Direction Finding", Roke Manor Research Ltd. a Siemens Company, Feb. 25, 2010.
Maloratsky, Reviewing Avionics Antenna Modules, Part 1, Microwaves&rf, Jun. 17, 2010.
Maloratsky, Reviewing Avionics Antenna Modules, Part 2, Microwaves&rf, Jul. 16, 2010.
Wu et al., "Switched-Element Direction Finding", IEEE Transactions on Aerospace and Electronic Systems, vol. 45, No. 3, pp. 1209-1217, Jul. 2009.
International Preliminary Report on Patentability pertaining to International Application No. PCT/US2015/017937, dated Sep. 9, 2016.

\* cited by examiner

SYSTEM AND METHOD FOR RECONFIGURING RF SIGNALS IN A MULTI-INPUT RECEIVER

CROSS-REFERENCE TO RELATED APPLICATIONS

This application claims the benefit of U.S. Provisional Application Ser. No. 61/945,410 (BAT 17499 MA), filed Feb. 27, 2014.

BACKGROUND

The present disclosure relates to RF receivers having parallel channel configurations. More specifically, the present disclosure introduces technology for selectively reconfiguring RF signals received by RF antennas and input into parallel channel receivers.

BRIEF SUMMARY

According to the subject matter of the present disclosure, a multi-input receiver includes a plurality of RF antennas, a multi-channel receiver, an input port configuration block (IPCB), and a configuration block controller. The plurality of RF antennas are communicatively coupled an input side of the IPCB. The multi-channel receiver is communicatively coupled to an output side of the IPCB. The IPCB includes at least two two-way connection modules, at least one four-way connection module, at least one direct connection module, and a plurality of electronic signal pathways. The plurality of electronic signal pathways extend from the input side of the IPCB to the output side of the IPCB via at least one of the connection modules. Each connection module includes a connection module input port communicatively coupled to an RF antenna of the plurality of RF antennas, a connection module output port communicatively coupled to a channel of the multi-channel receiver, and a mechanical diversion switch. The two-way connection modules additionally include a two-way power splitter and a mechanical interruption switch positioned within at least one of the electronic signal pathways between the input side of the IPCB and the two-way power splitter to control whether the input port of the two-way connection module is communicatively coupled to the two-way power splitter. The four-way connection module additionally includes a four-way power splitter and a mechanical interruption switch positioned within at least one of the electronic signal pathways between the input side of the IPCB and the four-way power splitter to control whether an input port of the four-way connection module is communicatively coupled to the four-way power splitter. The mechanical diversion switches and the plurality of electronic signal pathways are positioned and configured such that the mechanical diversion switch of each connection module communicatively couples a splitter bypass signal, a 1×2 signal, or a 1×4 signal to the connection module output port on a selective basis. The configuration block controller is programmed to control open and closed states of the mechanical diversion and interruption switches such that the IPCB is selectively configurable into an N=1 configuration, an N=2 configuration, an N=3 configuration, and an N=4 configuration. An RF signal at one connection module input port is transferred in substantially equivalent power components to four connection module output ports in the N=1 configuration. An RF signal at two connection module input ports is transferred in substantially equivalent power components to four connection module output ports in the N=2 configuration. An RF signal at three connection module input ports is transferred in substantially equivalent power components to three connection module output ports in the N=3 configuration. An RF signal at four connection module input ports is transferred in substantially equivalent power components to four connection module output ports in the N=4 configuration.

In accordance with one embodiment of the present disclosure, an input port configuration block (IPCB) includes an input side, an output side, at least two two-way connection modules, at least one four-way connection module, at least one direct connection module, a plurality of electronic signal pathways, and a configuration block controller. The plurality of electronic signal pathways extend from the input side of the IPCB to the output side of the IPCB via at least one of the connection modules. Each connection module includes a connection module input port, a connection module output port, and a mechanical diversion switch. The two-way connection modules additionally includes a two-way power splitter and a mechanical interruption switch positioned within at least one of the electronic signal pathways between the input side of the IPCB and the two-way power splitter to control whether the input port of the two-way connection module is communicatively coupled to the two-way power splitter. The four-way connection module additionally includes a four-way power splitter and a mechanical interruption switch positioned within at least one of the electronic signal pathways between the input side of the IPCB and the four-way power splitter to control whether an input port of the four-way connection module is communicatively coupled to the four-way power splitter. The mechanical diversion switches and the plurality of electronic signal pathways are positioned and configured such that the mechanical diversion switch of each connection module communicatively couples a splitter bypass signal, a 1×2 signal, or a 1×4 signal to the connection module output port on a selective basis. The configuration block controller is programmed to control open and closed states of the mechanical diversion and interruption switches such that the IPCB is selectively configurable into an N=1 configuration, an N=2 configuration, an N=3 configuration, and an N=4 configuration. An RF signal at one connection module input port is transferred in substantially equivalent power components to four connection module output ports in the N=1 configuration. An RF signal at two connection module input ports is transferred in substantially equivalent power components to four connection module output ports in the N=2 configuration. An RF signal at three connection module input ports is transferred in substantially equivalent power components to three connection module output ports in the N=3 configuration. An RF signal at four connection module input ports is transferred in substantially equivalent power components to four connection module output ports in the N=4 configuration.

In accordance with another embodiment of the present disclosure, a multi-input receiver includes a plurality of RF antennas, a multi-channel receiver, an input port configuration block (IPCB), and a configuration block controller. The plurality of RF antennas are communicatively coupled an input side of the IPCB. The multi-channel receiver is communicatively coupled to an output side of the IPCB. The IPCB includes at least two two-way connection modules, at least one four-way connection module, at least one direct connection module, and a plurality of electronic signal pathways. The plurality of electronic signal pathways extend from the input side of the IPCB to the output side of the IPCB via at least one of the connection modules. Each connection module includes a connection module input port communicatively coupled to an RF antenna of the plurality of RF antennas, a connection module output port communicatively coupled to a channel of the multi-channel receiver, and a mechanical diversion switch. The two-way connection modules additionally include a two-way power splitter and a mechanical interruption switch positioned within at least one of the electronic signal pathways between the input side of the IPCB and the two-way power splitter to control whether the input port of the two-way connection module is communicatively coupled to the two-way power splitter. The four-way connection module additionally comprises a four-way power splitter and a mechanical interruption switch positioned within at least one of the electronic signal pathways between the input side of the IPCB and the four-way power splitter to control whether an input port of the four-way connection module is communicatively coupled to the four-way power splitter. The mechanical diversion switches and the plurality of electronic signal pathways are positioned and configured such that the mechanical diversion switch of each connection module communicatively couples a splitter bypass signal, a 1×2 signal, or a 1×4 signal to the connection module output port on a selective basis, such that each bypass signal bypasses the two-way power splitters and the four-way power splitter, each 1×2 signal extends from one of the two-way power splitters, and each 1×4 signal extends from the four-way power splitter. The configuration block controller is programmed to control open and closed states of the mechanical diversion and interruption switches such that the IPCB is selectively configurable into an N=1 configuration, an N=2 configuration, an N=3 configuration, and an N=4 configuration. An RF signal at one connection module input port is transferred in substantially equivalent power components to four connection module output ports in the N=1 configuration. The four-way connection module is configured to receive an RF signal and the connection module input ports of the two-way connection modules and the direct connection module are terminated in the N=1 configuration. An RF signal at two connection module input ports is transferred in substantially equivalent power components to four connection module output ports in the N=2 configuration. Both two-way connection modules are configured to receive an RF signal and the connection module input ports of the four-way connection module and the direct connection module are terminated in the N=2 configuration. An RF signal at three connection module input ports is transferred in substantially equivalent power components to three connection module output ports in the N=3 configuration. Any three connection modules of the two-way connection modules, the four-way connection module, and the direct connection module are configured to receive an RF signal and the connection module input port of a module not configured to receive an RF signal is terminated in the N=3 configuration. An RF signal at four connection module input ports is transferred in substantially equivalent power components to four connection module output ports in the N=4 configuration. Each connection module is configured to receive an RF signal in the N=4 configuration.

Although the concepts of the present disclosure are described herein with primary reference to some specific multi-input receiver configurations, it is contemplated that the concepts will enjoy applicability to multi input receivers having any number of RF antennas and any number of channel outputs.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
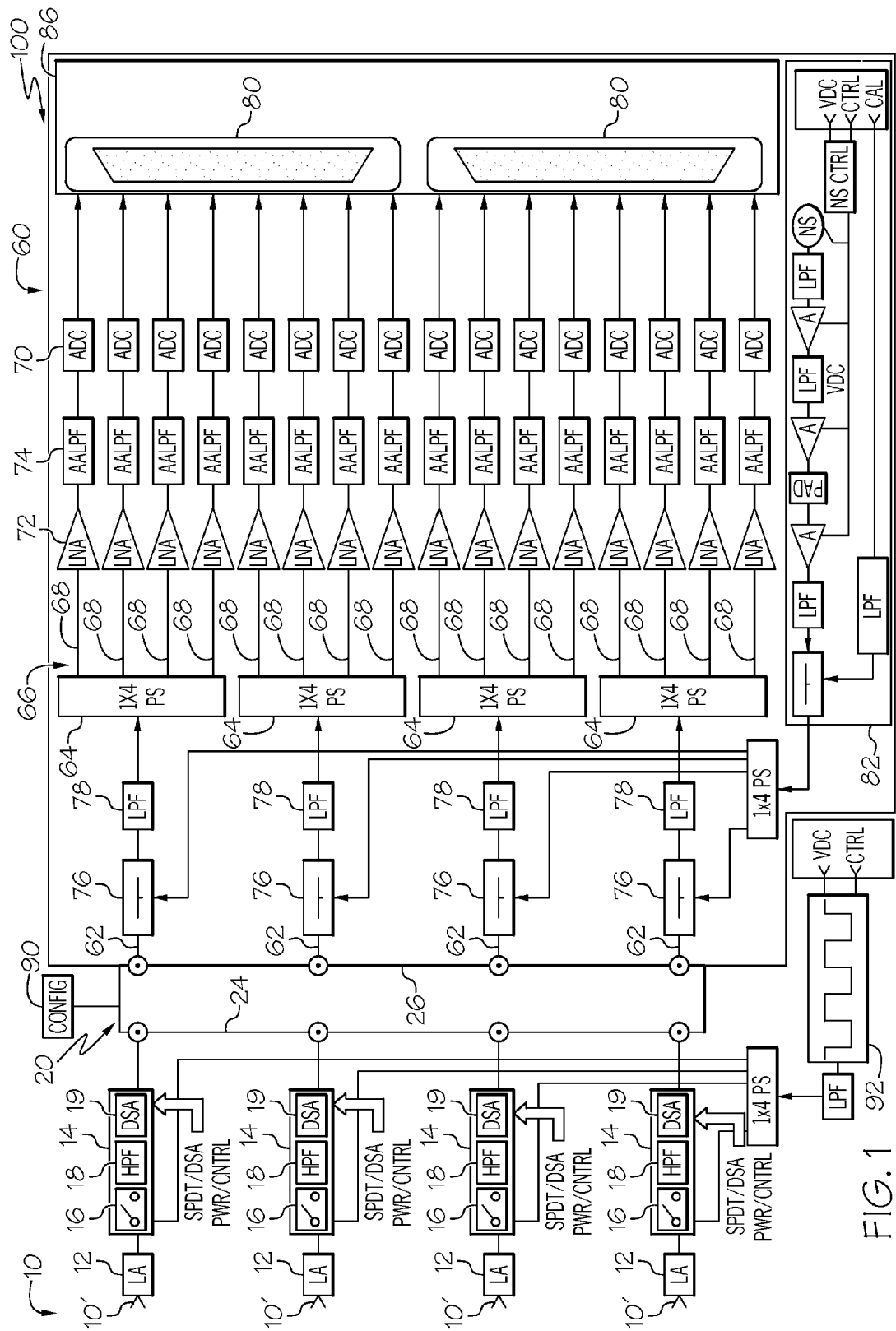
FIG. 1 is a block diagram of a multi-input receiver according to one or more embodiments shown and described herein.

Referring initially to FIG. 1, a multi-input receiver 100 is schematically illustrated comprising a plurality of RF antennas 10, a multi-channel receiver 60, an input port configuration block (IPCB) 20, and a configuration block controller 90. The plurality of RF antennas 10 may be communicatively coupled to an input side 24 of the IPCB 20 and the multi-channel receiver 60 may be communicatively coupled to an output side 26 of the IPCB 20.

Figure 2:
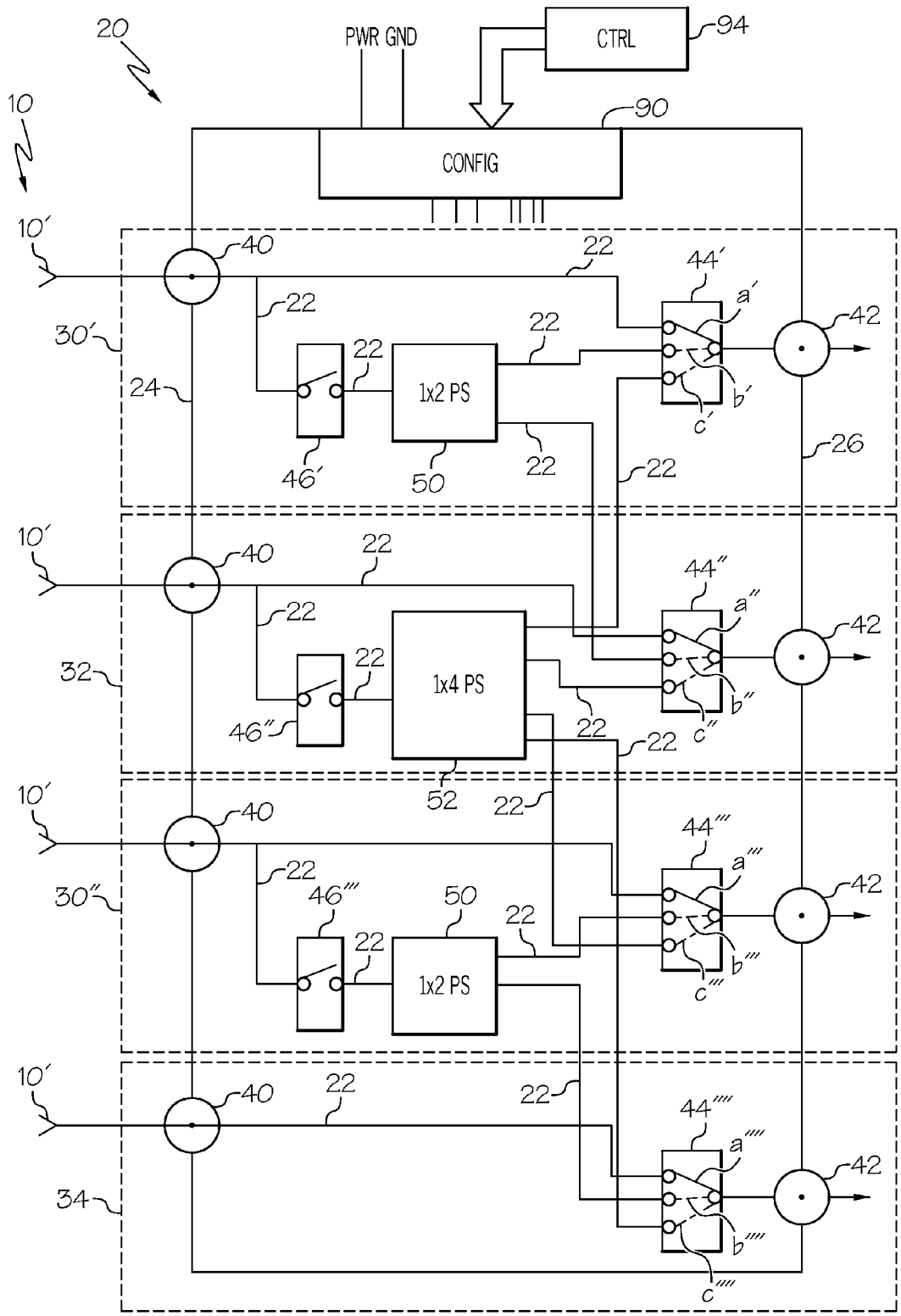
FIG. 2 is a block diagram of an input port configuration block (ICPB) of the multi-input receiver of FIG. 1 according to one or more embodiments shown and described herein.

Referring also to FIG. 2, the IPCB 20 is schematically illustrated in more detail. The IPCB 20 may comprise one or more connection modules (30', 30", 32, 34) including at least two two-way connection modules 30' and 30", at least one four-way connection module 32, and at least one direct connection module 34. Additionally, the IPCB 20 comprises a plurality of electronic signal pathways 22 extending from the input side 24 of the IPCB 20 to the output side 26 of the IPCB 20 via at least one of the connection modules (30', 30", 32, 34). In some embodiments, each electronic signal pathway 22 comprises an electrically conductive printed circuit board pathway. The electronic signal pathways 22 provide a pathway for RF signals input at the input side 24 of the IPCB 20 to traverse the IPCB 20 and be output at the output side 26 of the IPCB 20.

It is contemplated that each connection module (30', 30", 32, 34) comprises a connection module input port 40 communicatively coupled to an individual RF antenna 10' of the plurality of RF antennas 10 and a connection module output port 42 communicatively coupled to the multi-channel receiver 60, for example, a parallel channel 68, an intermediate receiver channel 62, or the like. The connection module input ports 40 are positioned at the input side 24 of the IPCB 20 and the connection module output ports 42 are positioned at the output side 26 of the IPCB 20. Further, the connection module input ports 40 and the connection module output ports 42 may each comprise a coaxial SMA connector.

Each connection module (30', 30", 32, 34) also comprises a mechanical diversion switch (44', 44", 44''', 44''''), for example, a double pull double throw latching switch, single pull triple throw switch, or the like. Further, the two-way connection modules 30', 30" and the four-way connection module 32 each comprise a mechanical interruption switch (46', 46", 46'''), for example, single pull single throw switches, single pull double throw switches, or the like. For the purpose of defining and describing the concepts of the present disclosure, a "mechanical switch" should be understood to be a switch that is configured to physically move between different switch positions in response to a received electronic signal, physical force, or some other motive force. For example, the switch positions may be responsive to an electronic signal received via a configuration block controller 90, which may comprise I/O (TTL/CMOS) control lines from an FPGA-based processor and may be decoded using a logic decoder and a driver interface of the configuration block controller 90.

Referring still to FIGS. 1 and 2, the two-way connection modules 30', 30" additionally comprise two-way power splitters 50 and mechanical interruption switches 46' and 46''', each positioned within at least one of the electronic signal pathways 22 between the input side 24 of the IPCB 20 and an individual two-way power splitter 50 to control whether the input port 40 of the two-way connection module 30', 30" is communicatively coupled to the two-way power splitter 50. While two two-way connection modules 30', 30" are depicted in FIG. 2, it should be understood that additional two-way connection modules 30', 30" are contemplated, for example, in alternative embodiments comprising more than four connection modules.

Referring still to FIGS. 1 and 2, the four-way connection module 32 may additionally comprise a four-way power splitter 52 and a mechanical interruption switch 46" positioned within at least one of the electronic signal pathways 22 between the input side 24 of the IPCB 20 and the four-way power splitter 52 to control whether an input port 40 of the four-way connection module 32 is communicatively coupled to the four-way power splitter 52. While one four-way connection module 32 is depicted in FIG. 2, it should be understood that additional four-way connection modules 32 are contemplated, for example, in alternative embodiments comprising more than four connection modules.

Referring still to FIGS. 1 and 2, the direct connection module 34 comprises a connection module input port 40, a connection module output port 42, and a mechanical diversion switch 44". The direct connection module 34 may not include the two-way power splitter 50 or the four way power splitter 52.

Referring now to FIG. 2, the mechanical diversion switches (44', 44", 44''', 44'''') and the plurality of electronic signal pathways 22 may be positioned and configured such that the mechanical diversion switch (44', 44", 44''', 44'''') of each connection module (30', 30", 32, 34) communicatively couples a splitter bypass signal, a 1×2 signal, or a 1×4 signal to the connection module output port 42 on a selective basis. For example, when an individual mechanical diversion switch 44 is positioned in an "a" position, as depicted in FIG. 2, the individual mechanical diversion switch 44 is positioned to communicatively couple an individual splitter bypass signal with the connection module output port 42. When an individual mechanical diversion switch 44 is positioned in the "b" position, as depicted in FIG. 2, the individual mechanical diversion switch 44 is positioned to communicatively couple an individual 1×2 signal to the connection module output port 42. When the individual diversion switch 44 is positioned in the "c" position, as depicted in FIG. 2, the individual mechanical diversion switch 44 is positioned to communicatively couple an individual 1×4 signal to the connection module output port 42.

Each bypass signal bypasses the two-way power splitters 50 and the four-way power splitter 52, for example, the splitter bypass signal may travel along an electronic signal pathway 22 extending from the connection module input port 40 of an individual connection module (30', 30", 32, 34) to the connection module output port 42 of the same connection module (30', 30", 32, 34). Each 1×2 signal extends from one of the two-way power splitters 50, for example, the 1×2 signal may travel along an electronic signal pathway 22 extending from an individual two-way power splitter 50 to an individual connection module output port 42. Each 1×4 signal extends from the four-way power splitter 54, for example, the 1×4 signal may travel along an electronic signal pathway 22 extending from the four-way power splitter 52 to an individual connection module output port 42.

Further, the IPCB 20 is configured to be software enabled for control of selective positions of each mechanical diversion switch (44', 44", 44''', 44'''') and each mechanical interruption switch (46', 46", 46'''). For example, the configuration block controller 90 is communicatively coupled to the IPCB 20 and may be programmed to control the position (e.g., open and closed states) of the mechanical diversion switches 44 and mechanical interruption switches 46 such that the IPCB 20 is selectively configurable into an N=1 configuration, an N=2 configuration, an N=3 configuration, and an N=4 configuration. The configuration block controller 90 may comprise a logic decoder and a driver interface. Further, the configuration block controller 90 may be communicatively coupled to a control interface 94 configured to provide instructions to the configuration block controller 90, for example, via an 8-bit control signal, or the like. In some embodiments, the configuration block controller 90 is housed within the IPCB 20. In other embodiments, the configuration block controller 90 is not housed within the IPCB 20, for example, the configuration block controller 90 may be incorporated into a personal computer. Further, the configuration block controller 90 may provide software instructions the IPCB 20 via wired or wireless communication pathways.

It is contemplated that each the configuration block controller 90 may be communicatively coupled to each mechanical interruption switch 46 and each mechanical diversion switch 44 via an I/O TTL/CMOS architecture. Further, in each of the N=1, N=2, N=3, and N=4 configurations, instantaneous wideband collection of the entire HF frequency range may be maintained. By providing multiple configurations of RF signal transfer between the plurality of RF antennas 10 and the multi-channel receiver 60, the multi-input receiver 100 may be able to receive and output a dynamic range of RF signals, for example, a range of RF signals within an ultra-wide instantaneous bandwidth.

In the N=1 configuration, the IPCB 20 is configured to receive an RF signal at an individual connection module input port 40 and transfer the RF signal in substantially equivalent power components to the connection module output ports 42 of each of the connection modules (30', 30", 32, 34). In particular, the four-way connection module 32 is configured to receive an RF signal while the two-way connection modules 30', 30" and the direct connection module 34 are terminated, for example, with a 50 ohm termination. The mechanical interruption switch 46 of the four-way connection module 32 is in the closed position and the mechanical interruption switch 46" of each two-way connection module 30', 30" are in the open position. Additionally, the mechanical diversion switch (44', 44", 44''', 44'''') of each connection module (30', 30", 32, 34) is positioned in the "c" position to communicatively couple an individual 1×4 signal output by the four-way power splitter 52 with the connection module output port 42 of each connection module (30', 30", 32, 34).

In the N=2 configuration, the IPCB 20 is configured to receive an RF signal at two individual connection module input ports 40 and transfer the RF signal in substantially equivalent power components to each of the connection modules (30', 30", 32, 34). In particular, each two-way connection module 30', 30" is configured to receive an RF signal and the four-way connection module 52 and the direct connection module 34 are terminated. The mechanical interruption switch 46' and 46'" of each two-way connection module 30', 30" is in the closed position and the mechanical interruption switch 46" of the four-way connection module 32 is in the open position. Additionally, the mechanical diversion switch (44', 44", 44'", 44"") of each connection module (30', 30", 32, 34) is positioned in the "b" position to communicatively couple an individual 1×2 signal output by the two-way power splitters 50 with the connection module output port 42 of each connection module (30', 30", 32, 34).

In the N=3 configuration, the IPCB 20 is configured to receive an RF signal at three individual connection module input ports 40 and transfer the RF signal in substantially equivalent power components to the connection module output ports 42 of any three of the four connection modules (30', 30", 32, 34). In particular, any three connection modules of the two-way connection modules 30', 30", the four-way connection module 32, and the direct connection module 34 are configured to receive an RF signal while the connection module not configured to receive an RF signal is terminated. The mechanical interruption switch (46', 46", 46'") of each connection module configured to receive the RF signal is in the open position. Additionally, the mechanical diversion switch (44', 44", 44'", 44"") of each connection module configured to receive an RF signal is positioned in the "a" position to communicatively couple an individual splitter bypass signal with the connection module output port 42 of each connection module configured to receive an RF signal. In the N=3 configuration, three of the four connection module output ports 42 receive a splitter bypass signal.

In the N=4 configuration, the IPCB 20 is configured to receive an RF signal at four individual connection module input ports 40 and transfer the RF signal in substantially equivalent power components to the connection module output ports 42 of each of the connection modules (30', 30", 32, 34). Each connection module (30', 30", 32, 34) is configured to receive an RF signal. The mechanical interruption switch 46' and 46'" of each two-way connection module 30', 30" is in the open position and the mechanical interruption switch 46" of the four-way connection module 52 is in the open position. The mechanical diversion switch (44', 44", 44'", 44"") of each connection module is positioned in the "a" position to communicatively couple an individual splitter bypass signal with the connection module output port 42 of each connection module (30', 30", 32, 34).

| Mechanical Switch Positions | | | | |
|---|---|---|---|---|
| | N = 1 | N = 2 | N = 3 | N = 4 |
| Interruption Switches | | | | |
| 46' | O | C | O | O |
| 46" | C | O | O | O |
| 46'" | O | C | O | O |
| Diversion Switches | | | | |
| 44' a' | O | O | C | C |
| 44' b' | O | C | O | O |
| 44' c' | C | O | O | O |
| 44" a" | O | O | C | C |
| 44" b" | O | C | O | O |
| 44" c" | C | O | O | O |
| 44'" a'" | O | O | C | C |
| 44'" b'" | O | C | O | O |
| 44'" c'" | C | O | O | O |
| 44"" a"" | O | O | C | C |
| 44"" b"" | O | C | O | O |
| 44"" c"" | C | O | O | O |

Note:
C = Closed;
O = Open

Referring now to the table above, the positions of each mechanical interruption switch (46', 46", 46'") and each mechanical diversion switch (44', 44", 44'", 44"") are depicted with respect to the N=1, N=2, N=3, and N=4 configurations. Each mechanical interruption switch (46', 46", 46'") may be positioned in the closed or open state and each mechanical diversion switch (44', 44", 44'", 44"") may be positioned in one of the "a," "b,' or "c," positions, (i.e., closed in one of the "a," "b," and "c" positions and open in the other "a," "b," and "c" positions).

Referring again to FIG. 1, the plurality of RF antennas 10 may comprise wideband RF antennas. Further, the plurality of RF antennas 10 may each be configured to receive RF signals between 1 MHz and 40 MHz, for example, between 2 MHz and 32 MHz. In the embodiment depicted in FIG. 1, each individual RF antenna 10' of the plurality of RF antennas 10 may be communicatively coupled to an individual connection module input port 40 of the IPCB 20. Further, each individual RF antenna 10' of the plurality of RF antennas 10 may be communicatively coupled to a linear amplifier 12 and an integrated RF antenna module 14, such that an RF signal received by an individual RF antenna 10' passes through the linear amplifier 12 and the integrated RF antenna module 14 before reaching an individual connection module input port 40 of the IPCB 20.

The integrated RF antenna module 14 includes an RF module diversion switch 16 (e.g., a single pull double throw switch), a high pass filter 18, and a digital step attenuator 19. Each RF module diversion switch 16 is structurally configured such that the RF module diversion switch 16 communicatively couples the RF signal received by each individual RF antenna 10' to the IPCB 20 or communicatively couples an RF comb generator 92 to the IPCB 20 on a selective basis. The RF comb generator 92 is structurally configured to provide a fundamental carrier and harmonics signal to the IPCB 20 when the RF module diversion switch 16 is positioned to communicatively couple the RF comb generator 92 to the IPCB 20. The fundamental carrier and harmonics signal provided by the RF comb generator 92 may be configured to phase align the IPCB 20 and/or measure phase offset of the connection module input ports 40 of the IPCB 20 and may span the entire HF spectrum (e.g., about 1 MHz to about 40 MHz).

Referring still to FIG. 1, the IPCB 20 may be communicatively coupled to the multi-channel receiver 60. For example, RF signals received by the plurality of RF antennas 10 may be input into the IPCB 20 and the IPCB 20 may output the RF signals into the multi-channel receiver 60. In some embodiments, the multi-channel receiver 60 comprises a p-channel receiver. In some embodiments, the multi-channel receiver 60 comprises a plurality of intermediate receiver channels 62 communicatively coupled to the connection module output ports 42 of the IPCB 20, a plurality of parallel channels 68 arranged in a plurality of discrete groups of parallel channels 66, and a plurality of multi-channel receiver power splitters 64 each structurally configured to receive an RF signal from an individual intermediate receiver channel 62 and output substantially equivalent power components of the RF signal to an individual discrete group of parallel channels 66. While the IPCB 20 is communicatively coupled to the multi-channel receiver 60 in FIG. 1, it should be understood that the IPCB 20 may be communicatively coupled to any RF receiver structurally configured to receive multiple RF signals.

Each individual discrete group of parallel channels 66 may comprise four parallel channels 68 and each multi-channel receiver power splitter 64 may comprise a four way power splitter structurally configured to output a substantially equivalent power component of the RF signal into each of the four parallel channels 68 of the discrete group of parallel channels 68. In the embodiment depicted in FIG. 1, the multi-channel receiver 60 comprises sixteen parallel channels 68 arranged in four discrete groups of parallel channels 66. Further, each discrete group of parallel channels 68 may receive an RF signal output by an individual output port 42 of the IPCB 20. It should be understood that in alternative embodiments, the multi-channel receiver 60 may comprise any number of parallel channels 68, arranged in discrete groups of parallel channels 66 each comprising any number of parallel channels 68.

Each parallel channel 68 of the plurality of parallel channels may be communicatively coupled to a low-noise amplifier 72, an anti-aliasing low power filter 74, and an analog-to-digital converter 70. These components may be arranged such that an RF signal traversing the parallel channel 68 passes sequentially through the low-noise amplifier 72, the anti-aliasing low power filter 74, and the analog-to-digital converter 70, however, other arrangements are contemplated. In operation, each analog-to-digital converter 70 may convert an RF signal into a digital signal. Further, each parallel channel 68 of the plurality of parallel channels may be communicatively coupled to an integrated circuit 80, for example, terminating at the integrated circuit 80 which may be structurally configured to receive and digitally sum the digital signals output by the analog-to-digital converter 70. In some embodiments, the integrated circuit 80 may comprise a field-programmable gate array.

Each individual intermediate receiver channel 62 of the plurality of intermediate channels may be communicatively coupled to a calibration coupler 76 and a low power filter 78. The calibration coupler 76 may comprise an in-line coupler and may be structurally configured to communicatively couple each intermediate receiver channel 62 with a calibration system 82. The calibration system 82 may be structurally configured to provide a dithering signal to the multi-channel receiver 60 that may be used to calibrate the multi-channel receiver 60. For example, the calibration system 82 may include one or more low power filters (LPF), one or more amplifiers (A), and one or more external noise generators (NS). Further, the calibration coupler may be structurally configured to communicatively the multi-channel receiver to a power supply (VDC), for example, a power supply housed within the calibration system 82.

In operation, the structure of the multi-channel receiver 60 may optimize signal dynamic range and spur-free dynamic range (SFDR), while maintaining an instantaneous bandwidth approaching the Nyquist bandwidth of each analog-to-digital converter 70 (about 80 MHz). Additionally, when the digital signals output by the analog-to-digital converter 70 are digitally summed by the integrated circuit 80, the summed total digital output is substantially the same the average digital signal, but unlike averaging the digital signals, the summed total digital output maintains the Nyquist bandwidth of the analog-to-digital converters 70. For a multi-channel receiver 60 comprising "p" parallel channels 68 and "n" number of analog-to-digital converter 70 bits, the increased maximum signal dynamic range is $10*\log(p*2^{2n})+10*\log(p)$, where the "$10*\log(p*2^{2n})$" portion is caused by the parallel channels 68 and the "$10*\log(p)$" portion is caused by the digitally summation performed by the integrated circuit 80. This increased maximum signal dynamic range may be achieved while maintaining the Nyquist bandwidth of about 80 MHz. For example, when the multi-channel receiver 60 includes 16 parallel channels, as depicted in FIG. 1, the multi-input receiver 100 may achieve a theoretical maximum dynamic range increase of 24 dB in the N=1 configuration, 18 dB in the N=2 configuration, and 12 dB in the N=3 and N=4 configurations, when compared to previous receivers.

The multi-input receiver 100 described herein enhances the dynamic range over typical receivers while maintaining the full Nyquist bandwidth. The multi-input receiver 100 is structurally configured to collect and process the RF signals within the entire HF band. Further, the multi-input receiver 100 is a multi-input and instantaneously reconfigurable receiver that may collect from any number or combination of RF antennas 10 while optimizing dynamic range and collecting the full HF frequency band. In some embodiments, the multi-input receiver 100 may be used in direction finding measurements and operations.

It is noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "programmed" or "configured" denotes an existing physical condition of the component and, as such, is to be taken as a definite recitation of the structural characteristics of the component.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A multi-input receiver comprising a plurality of RF antennas, a multi-channel receiver, an input port configuration block (IPCB), and a configuration block controller, wherein:
   the plurality of RF antennas are communicatively coupled an input side of the IPCB;
   the multi-channel receiver is communicatively coupled to an output side of the IPCB;
   the IPCB comprises at least two two-way connection modules, at least one four-way connection module, at least one direct connection module, and a plurality of electronic signal pathways;
   the plurality of electronic signal pathways extend from the input side of the IPCB to the output side of the IPCB via at least one of the connection modules;
   each connection module comprises a connection module input port communicatively coupled to an RF antenna of the plurality of RF antennas, a connection module output port communicatively coupled to a channel of the multi-channel receiver, and a mechanical diversion switch;
   the two-way connection modules additionally comprise a two-way power splitter and a mechanical interruption switch positioned within at least one of the electronic signal pathways between the input side of the IPCB and the two-way power splitter to control whether the input port of the two-way connection module is communicatively coupled to the two-way power splitter;
   the four-way connection module additionally comprises a four-way power splitter and a mechanical interruption switch positioned within at least one of the electronic signal pathways between the input side of the IPCB and the four-way power splitter to control whether an input port of the four-way connection module is communicatively coupled to the four-way power splitter;
   the mechanical diversion switches and the plurality of electronic signal pathways are positioned and configured such that the mechanical diversion switch of each connection module communicatively couples a splitter bypass signal, a 1×2 signal, or a 1×4 signal to the connection module output port on a selective basis;
   the configuration block controller is programmed to control open and closed states of the mechanical diversion and interruption switches such that the IPCB is selectively configurable into an N=1 configuration, an N=2 configuration, an N=3 configuration, and an N=4 configuration;
   an RF signal at one connection module input port is transferred in substantially equivalent power components to four connection module output ports in the N=1 configuration;
   an RF signal at two connection module input ports is transferred in substantially equivalent power components to four connection module output ports in the N=2 configuration;
   an RF signal at three connection module input ports is transferred in substantially equivalent power components to three connection module output ports in the N=3 configuration; and
   an RF signal at four connection module input ports is transferred in substantially equivalent power components to four connection module output ports in the N=4 configuration.

2. The multi-input receiver of claim 1, wherein the IPCB is configured to be software enabled for control of selective positions of each mechanical interruption switch and each mechanical diversion switch.

3. The multi-input receiver of claim 1, wherein the mechanical diversion switches and the plurality of electronic signal pathways are positioned and configured such that each bypass signal bypasses the two-way power splitters and the four-way power splitter, each 1×2 signal extends from one of the two-way power splitters, and each 1×4 signal extends from the four-way power splitter.

4. The multi-input receiver of claim 1, wherein in the N=1 configuration, the four-way connection module is configured to receive an RF signal and the connection module input ports of the two-way connection modules and the direct connection module are terminated.

5. The multi-input receiver of claim 1, wherein in the N=1 configuration:
   the mechanical interruption switch of the four-way connection module is in the closed position;
   the mechanical interruption switch of the two-way connection modules are in the open position; and
   the mechanical diversion switch of each connection module is positioned to communicatively couple an individual 1×4 signal output by the four-way power splitter with the connection module output port of each connection module.

6. The multi-input receiver of claim 1, wherein in the N=2 configuration, both two-way connection modules are configured to receive an RF signal and the connection module input ports of the four-way connection module and the direct connection module are terminated.

7. The multi-input receiver of claim 1, wherein in the N=2 configuration:
   the mechanical interruption switch of each two-way connection module is in the closed position;
   the mechanical interruption switch of the four-way connection module is in the open position; and
   the mechanical diversion switch of each connection module is positioned to communicatively couple an individual 1×2 signal output by the two-way power splitters with the connection module output port of each connection module.

8. The multi-input receiver of claim 1, wherein in the N=3 configuration, any three connection modules of the two-way connection modules, the four-way connection module, and the direct connection module are configured to receive an RF signal and the connection module input port of a module not configured to receive an RF signal is terminated.

9. The multi-input receiver of claim 8, wherein in the N=3 configuration:
   the mechanical interruption switch of each connection module configured to receive the RF signal is in the open position; and
   the mechanical diversion switch of each connection module configured to receive an RF signal is positioned to communicatively couple an individual splitter bypass signal with the connection module output port of each connection module configured to receive an RF signal.

10. The multi-input receiver of claim 1, wherein in the N=4 configuration, each connection module is configured to receive an RF signal.

11. The multi-input receiver of claim 1, wherein in the N=4 configuration:
  the mechanical interruption switch of each two-way connection module is in the open position and the mechanical interruption switch of the four-way connection module is in the open position; and
  the mechanical diversion switch of each connection module is positioned to communicatively couple an individual splitter bypass signal with the connection module output port of each connection module.

12. The multi-input receiver of claim 1, wherein the multi-channel receiver comprises:
  a plurality of intermediate receiver channels communicatively coupled to the connection module output ports of the IPCB,
  a plurality of parallel channels arranged in a plurality of discrete groups of parallel channels, and
  a plurality of multi-channel receiver power splitters each structurally configured to receive an RF signal from an individual intermediate receiver channel and output substantially equivalent power components of the RF signal to an individual discrete group of parallel channels.

13. The multi-input receiver of claim 12, wherein each individual discrete group of parallel channels comprises four parallel channels and each multi-channel receiver power splitter comprises a four way power splitter structurally configured to output a substantially equivalent power component of the RF signal into each of the four parallel channels of the discrete group of parallel channels.

14. The multi-input receiver of claim 1, wherein each RF antenna is communicatively coupled to an integrated RF antenna module comprising an RF module diversion switch, a high pass filter, and a digital step attenuator.

15. The multi-input receiver of claim 14, wherein each RF module diversion switch is structurally configured such that the RF module diversion switch communicatively couples the RF signal received by each RF antenna to the IPCB or communicatively couples an RF comb generator to the IPCB on a selective basis.

16. The multi-input receiver of claim 15, wherein the RF comb generator is structurally configured to provide a fundamental carrier and harmonics signal to the IPCB when the RF module diversion switch is positioned to communicatively coupled the RF comb generator to the IPCB.

17. The multi-input receiver of claim 16, wherein the fundamental carrier and harmonics signal provided by the RF comb generator is configured to phase align the IPCB.

18. The multi-input receiver of claim 16, wherein the fundamental carrier and harmonics signal provided by the RF comb generator is configured to measure phase offset of the connection module input ports.

19. An input port configuration block (IPCB) comprising an input side, an output side, at least two two-way connection modules, at least one four-way connection module, at least one direct connection module, a plurality of electronic signal pathways, and a configuration block controller, wherein:
  the plurality of electronic signal pathways extend from the input side of the IPCB to the output side of the IPCB via at least one of the connection modules;
  each connection module comprises a connection module input port, a connection module output port, and a mechanical diversion switch;
  the two-way connection modules additionally comprise a two-way power splitter and a mechanical interruption switch positioned within at least one of the electronic signal pathways between the input side of the IPCB and the two-way power splitter to control whether the input port of the two-way connection module is communicatively coupled to the two-way power splitter;
  the four-way connection module additionally comprises a four-way power splitter and a mechanical interruption switch positioned within at least one of the electronic signal pathways between the input side of the IPCB and the four-way power splitter to control whether an input port of the four-way connection module is communicatively coupled to the four-way power splitter;
  the mechanical diversion switches and the plurality of electronic signal pathways are positioned and configured such that the mechanical diversion switch of each connection module communicatively couples a splitter bypass signal, a 1×2 signal, or a 1×4 signal to the connection module output port on a selective basis;
  the configuration block controller is programmed to control open and closed states of the mechanical diversion and interruption switches such that the IPCB is selectively configurable into an N=1 configuration, an N=2 configuration, an N=3 configuration, and an N=4 configuration;
  an RF signal at one connection module input port is transferred in substantially equivalent power components to four connection module output ports in the N=1 configuration;
  an RF signal at two connection module input ports is transferred in substantially equivalent power components to four connection module output ports in the N=2 configuration;
  an RF signal at three connection module input ports is transferred in substantially equivalent power components to three connection module output ports in the N=3 configuration; and
  an RF signal at four connection module input ports is transferred in substantially equivalent power components to four connection module output ports in the N=4 configuration.

20. A multi-input receiver comprising a plurality of RF antennas, a multi-channel receiver, an input port configuration block (IPCB), and a configuration block controller, wherein:
  the plurality of RF antennas are communicatively coupled an input side of the IPCB;
  the multi-channel receiver is communicatively coupled to an output side of the IPCB;
  the IPCB comprises at least two two-way connection modules, at least one four-way connection module, at least one direct connection module, and a plurality of electronic signal pathways;
  the plurality of electronic signal pathways extend from the input side of the IPCB to the output side of the IPCB via at least one of the connection modules;
  each connection module comprises a connection module input port communicatively coupled to an RF antenna of the plurality of RF antennas, a connection module output port communicatively coupled to a channel of the multi-channel receiver, and a mechanical diversion switch;
  the two-way connection modules additionally comprise a two-way power splitter and a mechanical interruption switch positioned within at least one of the electronic signal pathways between the input side of the IPCB and the two-way power splitter to control whether the input port of the two-way connection module is communicatively coupled to the two-way power splitter;

the four-way connection module additionally comprises a four-way power splitter and a mechanical interruption switch positioned within at least one of the electronic signal pathways between the input side of the IPCB and the four-way power splitter to control whether an input port of the four-way connection module is communicatively coupled to the four-way power splitter;

the mechanical diversion switches and the plurality of electronic signal pathways are positioned and configured such that the mechanical diversion switch of each connection module communicatively couples a splitter bypass signal, a 1×2 signal, or a 1×4 signal to the connection module output port on a selective basis, such that each bypass signal bypasses the two-way power splitters and the four-way power splitter, each 1×2 signal extends from one of the two-way power splitters, and each 1×4 signal extends from the four-way power splitter;

the configuration block controller is programmed to control open and closed states of the mechanical diversion and interruption switches such that the IPCB is selectively configurable into an N=1 configuration, an N=2 configuration, an N=3 configuration, and an N=4 configuration;

an RF signal at one connection module input port is transferred in substantially equivalent power components to four connection module output ports in the N=1 configuration;

the four-way connection module is configured to receive an RF signal and the connection module input ports of the two-way connection modules and the direct connection module are terminated in the N=1 configuration, an RF signal at two connection module input ports is transferred in substantially equivalent power components to four connection module output ports in the N=2 configuration;

both two-way connection modules are configured to receive an RF signal and the connection module input ports of the four-way connection module and the direct connection module are terminated in the N=2 configuration, an RF signal at three connection module input ports is transferred in substantially equivalent power components to three connection module output ports in the N=3 configuration;

any three connection modules of the two-way connection modules, the four-way connection module, and the direct connection module are configured to receive an RF signal and the connection module input port of a module not configured to receive an RF signal is terminated in the N=3 configuration;

an RF signal at four connection module input ports is transferred in substantially equivalent power components to four connection module output ports in the N=4 configuration; and each connection module is configured to receive an RF signal in the N=4 configuration.

\* \* \* \* \*

UNITED STATES PATENT AND TRADEMARK OFFICE
CERTIFICATE OF CORRECTION

PATENT NO. : 9,906,253 B2
APPLICATION NO. : 15/121608
DATED : February 27, 2018
INVENTOR(S) : Welsh Page 1 of 1

It is certified that error appears in the above-identified patent and that said Letters Patent is hereby corrected as shown below:

In the Claims

Column 11, Line 17, Claim 1:
"the plurality of RF antennas are communicatively coupled"
Should read:
--the plurality of RF antennas are communicatively coupled to--; and Column 14, Line 47, Claim 20:
"the plurality of RF antennas are communicatively coupled"
Should read:
--the plurality of RF antenna are communicatively coupled to--.

Signed and Sealed this
First Day of January, 2019

Andrei Iancu
*Director of the United States Patent and Trademark Office*